W. MICHAELIS.
PLIERS.
APPLICATION FILED DEC. 11, 1913.
1,085,461.
Patented Jan. 27, 1914.
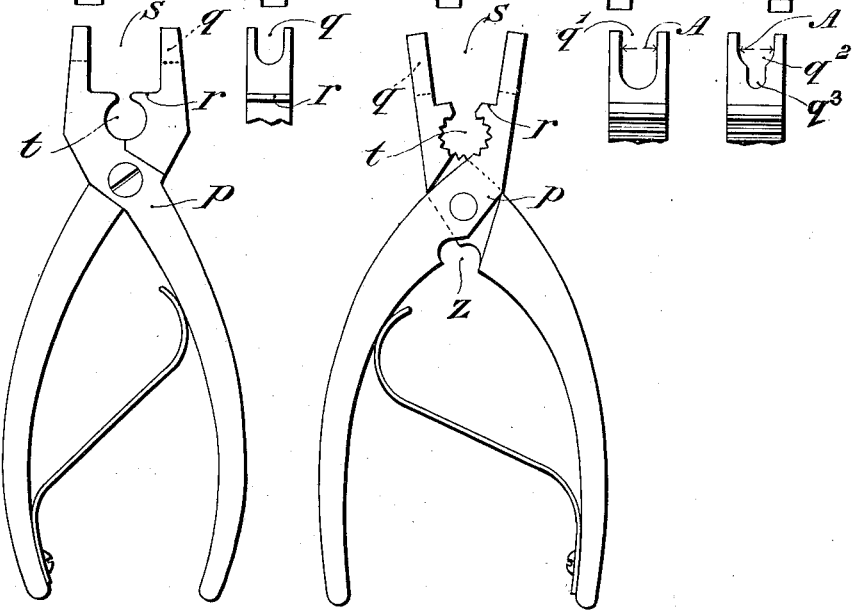
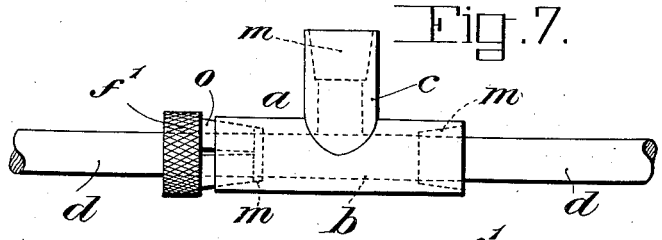
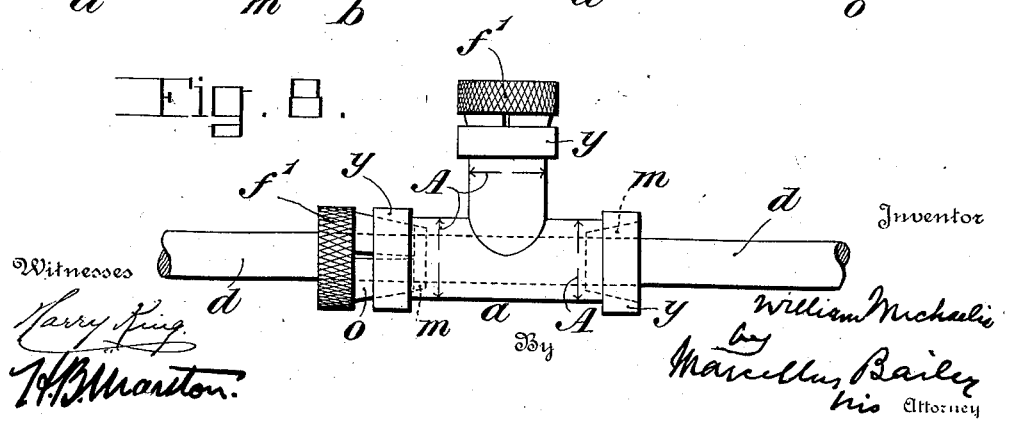

UNITED STATES PATENT OFFICE.

WILLIAM MICHAELIS, OF LONDON, ENGLAND, ASSIGNOR TO NÜRNBERGER METALL- & LACKIERWARENFABRIK VORM. GEBRÜDER BING A.-G., OF NUREMBERG, GERMANY.

PLIERS.

1,085,461.  Specification of Letters Patent.  Patented Jan. 27, 1914.

Original application filed May 22, 1913, Serial No. 769,318. Divided and this application filed December 11, 1913. Serial No. 805,969.

*To all whom it may concern:*

Be it known that I, Dr. WILLIAM MICHAELIS, a subject of the German Emperor, residing at London, England, have invented a certain new and useful Improvement in Pliers, of which the following is a specification.

This application is a division of my application for an improvement in constructional toys, filed May 22, 1913, Ser. No. 769,318, and is directed to the pliers designed and adapted for use in making and releasing the connection between the joint members, bars, and locking members described and illustrated in said last named application. The jaws of the pliers, for this purpose, are so constructed as to form two distinct mouths—an outer mouth to be used in making the connection, and an inner mouth to be used in releasing the connection. The outer mouth is formed by recessing the opposed faces of the outer portions of the jaws to a sufficient extent to permit them to grip between them the joint member and the wedge member to be pressed together, the opposed faces of this portion of the jaws being straight and the dimensions of the mouth being such that when the jaws are closed these straight faces will be substantially parallel. These opposed straight faced portions of the jaws are forked to permit them to straddle such parts as would otherwise interfere with their taking an end grip upon the joint and wedge member to be pressed together. The inner mouth is formed by that portion of the jaws between the outer mouth and the pivot hinge of the pliers, the opposed faces of this portion of the jaws being concave to make substantially a circular closure when brought together, and being of such dimensions as to take in and peripherally grip the head of the wedge member in the operation of releasing the connection between it and the joint member. These and other features of the invention will be readily understood by reference to the accompanying drawings, in which—

Figure 1 is a front elevation of pliers embodying my invention; Fig. 2 is a face view of a portion of one of the jaws of these pliers; Fig. 3 is a front elevation of a modified form of such pliers; Fig. 4 is a face view of a portion of one of the jaws of these pliers; Fig. 5 is a face view of a portion of the other jaw of the same; Fig. 6 is a view of a wedge member; Fig. 7 is an elevation of a rod, a joint member, and said wedge member assembled together; Fig. 8 is a similar view of the like assembled parts with a modification in the conformation of the joint member.

In Fig. 7, $a$ is a tubular T-shaped joint member; $d$ is a rod passing through said joint member; and $f'$, $o$, is the wedge member by which the rod and joint member are secured together. The wedge member, shown separately in Fig. 6, is annular and fits easily upon the rod $d$; it has a head $f'$ and a longitudinally externally tapering portion $o$ longitudinally slit or slotted to form resilient tongues for the reception of which there is a correspondingly shaped conical enlargement $m$ in the end of the tubular joint member $a$, there being one of these enlargements in the bore at each one of the three ends of the joint member. The parts in Fig. 8 are the same as in Fig. 7, save that the joint member has externally flanged or shouldered ends $y$. Two joint members may be placed together end to end upon the same rod and secured in place thereon through the intermediary of an interposed wedge member which for this purpose, of course, will be provided with two conical portions $o$, one on each side of the head $f'$, as will be understood without further explanation.

The tool shown in Figs. 1–5 of the drawings is intended to facilitate the operation of pressing home the wedge member into the joint member, as well as of withdrawing the wedge member, when it is desired to release the thus established connection. For this purpose the tool consists of pliers $p$ having an outer mouth $s$ and an inner mouth $t$. The outer mouth $s$ is formed by recessing the outer portion of the jaws, the opposed faces $r$ of this portion of the jaws being straight, and the width of the recess, or outer mouth $s$, when the jaws are closed, being such that a joint member, together with the wedge member which is to be pressed into it, can be gripped between said jaws, the face of one jaw bearing against the head of the wedge member, and the face of the other jaw bearing against the end of the joint member opposite that into which the wedge member is to be pressed. This portion of the jaws is forked as seen at $q$, so that in using the pliers as just described, the jaws may straddle the rod $d$, thus enabling them to get a better and more extended hold upon the parts to be pressed together. In this way a perfectly firm and solid connection between the rod, the joint member and the wedge member, can easily be made. The inner mouth $t$ is formed by that portion of the jaws between the outer mouth and the pivot hinge of the pliers, the opposed faces of this portion of the jaws being concave, as shown, to form a recess of substantially circular form when the jaws are closed, and of dimensions to take a peripheral grip upon the head $f'$ of the wedge member. In order to release the connection between the parts, the head $f'$ of the wedge member is thus held with the inner mouth $t$ of the pliers, and the joint member is released by turning or twisting it by hand.

In using pliers for connecting wedge members with joint members, such as shown in Fig. 7, of the same external diameter throughout, the outer mouth $s$ must have a width equal to the combined length of the joint member and the wedge member. The pliers, therefore, cannot well be used except with joint members of this kind which are of a certain definite and fixed length. Inasmuch, however, as these joint members are necessarily of widely varying lengths, it is desirable to so construct them that the same pliers can be used with joint members of any length. To this end I form the joint members with annularly flanged or shouldered ends $y$ as seen in Fig. 8. And I prefer to use in connection with the same, pliers such as shown in Figs. 3, 4, 5. This tool has an outer mouth $s$ and an inner mouth $t$, the same as in the tool illustrated in Figs. 1 and 2; one of its jaws is forked as at $q'$, Fig. 4, the width of the fork corresponding to the diameter $A$ of the joint member $a$ back of the shouldered end $y$. The other jaw is also forked, preferably as shown in Fig. 4, the outer portion $q^2$ of the fork corresponding in width to the diameter $A$ of the joint member back of the shouldered end $y$, while the remaining portion $q^3$ is of a width corresponding to the diameter of the rod $d$. In using this form of pliers to press together the parts shown in Fig. 8, the head $f$ of the wedge member, and the contiguous shouldered end $y$ of the joint member are gripped between the jaws of the pliers, the fork $q'$ of the one jaw straddling the body of the joint member back of the shouldered end $y$, and the other jaw bearing against the head $f'$ of the wedge member, with the lower portion $q^3$ of its fork straddling the rod $d$. If two joint members are to be pressed toward each other upon an intermediate wedge member, as hereinbefore suggested, then the fork $q'$ of the one jaw will straddle the body of one of the joint members back of the contiguous shouldered end $y$ of that member, while the outer portion $q^2$ of the fork of the other jaw will correspondingly straddle the body of the other joint member. Back of the hinge joint of the pliers, in Fig. 3, a third mouth $z$ is provided by which the rod $d$ can be gripped whenever desired. A like mouth can be provided in the pliers shown in Fig. 1 if preferred.

What I claim herein as new and desire to secure by Letters Patent, is:

1. Pliers having jaws, the opposed faces of which for the outer portion of their length are cut away through the whole of this portion of their length to form, when the jaws are closed, an open-mouthed straight-faced recess of substantially the same width throughout, and back of said recess are concaved to make a substantially circular closure $t$ when brought together, the portions of the jaws forming the open-mouthed straight-faced recess being forked, substantially as and for the purposes hereinbefore set forth.

2. Pliers having jaws forked for the outer portions of their length, said portions being cut away throughout their length to form when the jaws are closed a straight-faced recess of substantially the same width throughout with an open mouth of the same width with the recess, the fork $q'$ in the one jaw being of the same width throughout and the fork in the other jaw having an outer portion $q^2$ of a width corresponding to that of the fork $q'$, and a relatively narrower inner portion $q^3$, substantially as and for the purposes hereinbefore set forth.

In testimony whereof I affix my signature in presence of two witnesses.

Dr. WILLIAM MICHAELIS.

Witnesses:
Milo A. Jewett,
Charles A. Halley, Jr.